US009194974B2

(12) United States Patent
Roy et al.

(10) Patent No.: US 9,194,974 B2
(45) Date of Patent: *Nov. 24, 2015

(54) METHOD TO PREDICT DENSE HYDROCARBON SATURATIONS FOR HIGH PRESSURE HIGH TEMPERATURE

(75) Inventors: Indranil Roy, Sugar Land, TX (US); Chris Wilkinson, Houston, TX (US); Partha Ganguly, Sugar Land, TX (US); Richard Lewis, Edmond, OK (US); Oliver Mullins, Ridgefield Road, CT (US); Colin Longfield, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 337 days.

This patent is subject to a terminal disclaimer.

(21) Appl. No.: 13/225,192

(22) Filed: Sep. 2, 2011

(65) Prior Publication Data

US 2012/0065951 A1    Mar. 15, 2012

Related U.S. Application Data

(60) Provisional application No. 61/385,037, filed on Sep. 21, 2010, provisional application No. 61/379,495, filed on Sep. 2, 2010, provisional application No. 61/379,520, filed on Sep. 2, 2010, provisional application No. 61/379,582, filed on Sep. 2, 2010, provisional application No. 61/384,429, filed on Sep. 20, 2010.

(51) Int. Cl.
*G01V 3/38*    (2006.01)
*G01V 3/20*    (2006.01)

(52) U.S. Cl.
CPC ... *G01V 3/38* (2013.01); *G01V 3/20* (2013.01)

(58) Field of Classification Search
USPC ............................................. 703/10
See application file for complete search history.

(56) References Cited

U.S. PATENT DOCUMENTS

| 5,256,574 | A | 10/1993 | Neuburger et al. |
| 5,633,590 | A | 5/1997 | Vail, III |
| 7,526,953 | B2 | 5/2009 | Goodwin et al. |
| 8,271,248 | B2* | 9/2012 | Pomerantz et al. ............. 703/10 |
| 2003/0070480 | A1* | 4/2003 | Herron et al. ............. 73/152.14 |
| 2005/0114030 | A1* | 5/2005 | Liu et al. ........................ 702/11 |
| 2006/0136135 | A1* | 6/2006 | Little et al. ..................... 702/13 |

(Continued)

OTHER PUBLICATIONS

Ussher et al. (Understanding the resistivities observed in geothermal systems, 2000, Proceedings World Geothermal congress).*

(Continued)

*Primary Examiner* — Omar Fernandez Rivas
*Assistant Examiner* — Iftekhar Khan
(74) *Attorney, Agent, or Firm* — John Vereb

(57) ABSTRACT

A method for characterizing one or more properties of a geological formation including brine and a dense vapor phase includes inputting at least one first property of the geological formation including resistivity of a vapor phase into a model including an equation of state (EOS) model, the model accounting for a high temperature effect on the dense vapor where that the dense vapor has a non-infinite resistivity. At least the EOS model is solves to provide data relating to at least one second property of the geological formation. The data relating to the at least one second property is output to a display device for visual inspection.

4 Claims, 9 Drawing Sheets

(56) References Cited

U.S. PATENT DOCUMENTS

2006/0217888 A1* 9/2006 Frenkel .......................... 702/7
2009/0235731 A1   9/2009 Zuo et al.

OTHER PUBLICATIONS

Yousheng et al. (Conductivity of NaCl solution at 0.4-5.0 GPa and 25-500 C, 1997, National Natural Science Foundation of China).*
Bilardo et al. (Carbon Sequestration:Key features and issues, Offshore Mediterian Conference, 2007).*
Boyd et al. ("The Lowdown on Low-Resistivity Pay", Oilfield Review, 1995).*
Roberts et al.("Electrical Resistivity Measurements of Brine Saturated Porous Media Near Reservoir Conditions: Awibengkok Preliminary Results", Geothermal Resources Council, 1999,pp. 1-15 ).*
International Search Report and Written Opinion of PCT Application No. PCT/US2011/05427 dated Mar. 28, 2012.
Ucok, H., Ershaghi, I. and Olhoeft, G. R., U.S. Geological Survey and L. L. Handy,USC "Resistivity of Brine Saturated Rock Samples at Elevated Temperatures", Stanford Geothermal Workshop, 1979, pp. 305-315.
Ucok, H., "Temperature Dependence of the Electrical Resistivity of Aqueous Salt Solutions and Solution Saturated Porous Rocks", Ph.D. Dissertation, University of Southern California, (1979), pp. 1-169.
Ucok, H., Ershaghi, I. and Olhoeft, G. R.,"Electrical Resistivity of Geothermal Brines", presented at the Proc. SPE International Symposium on Oilfield and Geothermal Chemistry, Houston, Texas (1979), pp. 163-172. Also, published in the Apr. 1980 issue of the Journal of Petroleum Technology. pp. 717-727.
Quist, Arvin S. and Marshall, William L., "Electrical Conductances of Aqueous Sodium Chloride Solutions from 0 to 800 degrees C and at Pressures to 4000 Bars", The Journal of Physical Chemistry, vol. 72 No. 2 Feb. 1968, pp. 684-703.

* cited by examiner

METHOD TO PREDICT DENSE HYDROCARBON SATURATIONS FOR HIGH PRESSURE HIGH TEMPERATURE

RELATED APPLICATIONS

This application, pursuant to 35 U.S.C. §119(e), claims priority to U.S. Provisional Application Ser. Nos. 61/384,429, 61/379,520, 61/379,495, 61/379,582, that were all filed on Sep. 2, 2010 and 61/384,429, which was filed Sep. 20, 2010. Each of these applications is herein incorporated by reference in its entirety.

BACKGROUND

In accordance with known interpretation techniques, one or more types of porosity-related measurements is combined with measurements of electrical resistivity, or its inverse, electrical conductivity, to infer the character of the fluid content within the pore spaces of a geological formation. Assuming the porous rock matrix is non-conductive, it has been theorized the electrical properties depend only upon the brine or connate water contained in the pores of the rock and the geometry of the pores. The conductivity of a fluid-saturated rock is due to the ions of the dissolved salt that make up the brine and the magnitude of the electrical conductivity has been presumed to be primarily a function of the brine content of the reservoir fluid. Pioneer work in the field was performed by G. E. Archie as set forth in his paper "The Electrical Resistivity Log As An Aid In Determining Some Reservoir Characteristics", Trans. AIME, v. 146, 1942, PP. 54-62.

As is known in the art, the value of the resistivity of a rock which is completely saturated with brine of a given concentration at a specific temperature was defined by Archie as follows:

$$F = R_o/R_w = \Phi^{-m}$$

where F is the formation resistivity factor; $R_o$ is the resistivity of rock 100 percent saturated with brine expressed in ohm-meters; $R_w$ is resistivity of brine expressed in ohm-meters; $\Phi$ is the porosity and m is an empirical constant. Resistivities of oil field brines have been investigated and values published for a small range of relatively low temperatures historically encountered during drilling.

Current modeling techniques utilize this information in algorithms to relate the water conductivity to brine salinity, and to use this information to infer the amount of brine present in the reservoir fluid, and thus the hydrocarbon content of the reservoir.

SUMMARY

A method for characterizing one or more properties of a geological formation including brine and a dense vapor phase includes inputting at least one first property of the geological formation including resistivity of a vapor phase into a model including an equation of state (EOS) model, the model accounting for a high temperature effect on the dense vapor where that the dense vapor has a non-infinite resistivity. At least the EOS model is solves to provide data relating to at least one second property of the geological formation. The data relating to the at least one second property is output to a display device for visual inspection.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the invention will be apparent from the following description and the appended claims.

DETAILED DESCRIPTION

Figure 1:
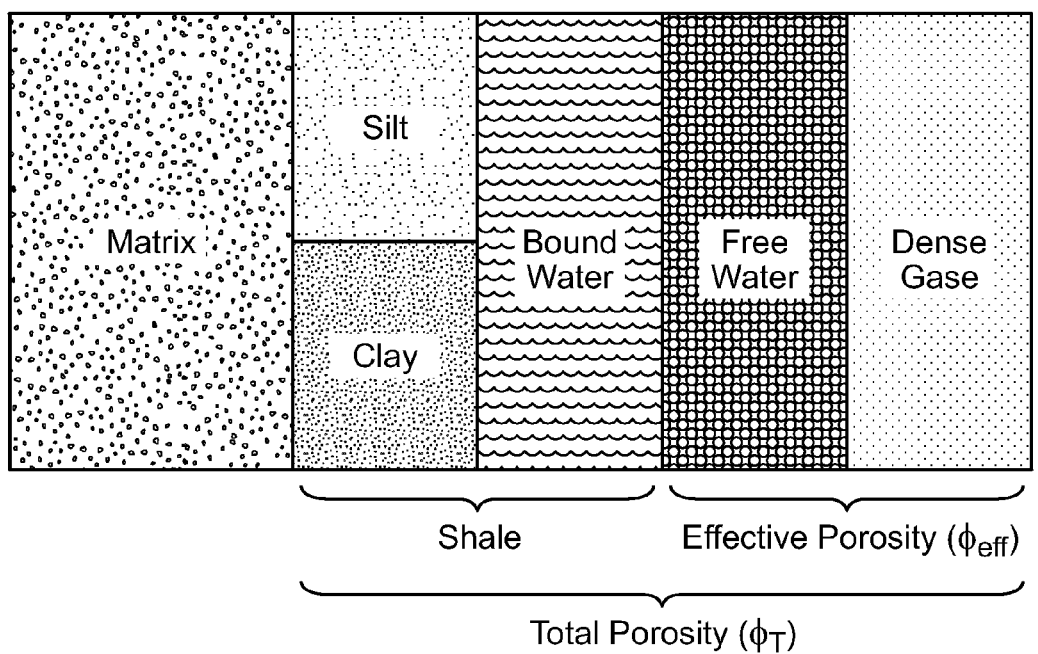
FIG. 1 illustrates a diagrammatical representation of the salient components of a geological formation.

It has now been discovered that reservoir fluids, such as brine, dense gases, bound water and/or dense vapor phases, may depart significantly from ideal behavior, especially at the higher temperatures and pressures that are being encountered as deeper wells are being drilled. Thus, previous modeling and simulation techniques may mischaracterize reservoirs and fluids contained therein. Embodiments disclosed herein relate to reservoir characterization techniques developed with the newly discovered phenomena that extreme downhole conditions significantly affect the properties of reservoir fluids, including the brine and/or dense vapor phases. More specifically, embodiments disclosed herein relate to reservoir characterization techniques accounting for bound water, a high temperature effect on the brine, a pressure effect or high pressure effect on the brine, a high temperature effect on the dense vapor phase, and/or a pressure effect or high pressure effect on the dense vapor phase, or a combination thereof. Reservoir characterization techniques for embodiments disclosed herein may include modeling or simulation of a reservoir, reservoir fluid, or phase(s) of a reservoir fluid based on known component data (e.g., molecular weights and other physical or chemical properties), as well as data stored or input based on laboratory measurements, downhole measurements, research data presented in publications, well logs, or other relevant data sources as may be known or recognizable to one skilled in the art.

As used herein, a dense vapor phase may include and be referring to a sub and/or super critical fluid, for example $CO_2$, $H_2S$, $H_2O$, solvated ions and other components.

As used herein, "high temperature effect" is defined as deviation(s) from ideal behavior of a reservoir, reservoir fluid, or a phase of a reservoir fluid, at elevated temperatures, such as greater than 150° F., 200° F., 250° F., 300° F., 350° F., 400° F., 450° F., 500° F. or greater in various embodiments. As used herein, "pressure effect" is defined as the influence pressure may have on the behavior of a reservoir, reservoir fluid, or phase of a reservoir fluid. As used herein, "high pressure effect" is defined as deviation(s) from ideal behavior of a reservoir, reservoir fluid, or a phase of a reservoir fluid, at elevated pressures, such as greater than 10 ksi, 15 ksi, 20 ksi, 25 ksi, 30 ksi or greater in various embodiments. Models or algorithms used to estimate or predict the character of a reservoir, reservoir fluid, or phase of a reservoir fluid in embodiments disclosed herein thus include functions or derivations to more accurately calculate or estimate one or more properties of the reservoir, reservoir fluid, or phase of a reservoir fluid accounting for one or more of these effects.

Reservoir fluids are known to those of ordinary skill in the art to contain various phases and components. For example, reservoirs may include an aqueous phase (e.g., water and dissolved salts), a hydrocarbon gas phase (e.g., hydrogen, methane, ethane, ethylene, and other light hydrocarbons, as well as carbon dioxide, hydrogen sulfide, water, solvated inorganic ions, and numerous other compounds), and a liquid hydrocarbon phase (e.g., pentanes, hexanes, etc., which may include heavy hydrocarbons, such as asphaltenes, waxes etc.), as well as carbon dioxide, hydrogen sulfide, among numerous other compounds. Thermodynamic models used in embodiments herein may rely on a database of stored properties for one or more of these components, which may include one or more of molecular formula, molar weight, as well as pressure-volume-temperature data (such as one or more of phase envelopes, boiling points, melting points, density, viscosity, solubility, etc.). Reservoirs at high temperature and high pressure may also include a dense vapor phase (e.g., methane, ethane, ethylene, other light hydrocarbons, carbon dioxide, and hydrogen sulfide, water, solvates, inorganic ions, among numerous other compounds).

Thermodynamic models have now been developed that account for the high temperature effects on properties of the brine, including the non-ideal behavior discovered at extreme downhole conditions. Functions, algorithms, or derivations used to account for the high temperature effects on the brine that may be included in embodiments of the thermodynamic model may account for changes in one or more of molecular interactions, solubility constants or solubility characteristics of water (solvating power), density, electronegativity, dipole moment, heat capacity, hydrogen bonding, miscibility, as well as electrophoretic/relaxation effects and ion pairings, among others, as a function of temperature, including deviations from ideal behavior that may be estimated, measured, or observed at elevated downhole temperatures.

Embodiments of the thermodynamic model may also account for the effect of pressure on the brine, and thus on the geological formation and the character of the reservoir fluid. Heretofore the effect of pressure on conductivity/resistivity or various other properties of a downhole fluid has not been accounted for in efforts to determine the character of a reservoir. Thermodynamic models according to embodiments disclosed herein may include functions or derivations to account for the effect of pressure on the brine. Such functions or derivations, in some embodiments, may also account for deviations from ideal behavior at elevated pressures (the high pressure effect). Functions, algorithms, or derivations used to account for the pressure effects and high pressure effects on the brine that may be included in embodiments of the thermodynamic model may account for changes in one or more of molecular interactions, solubility constants or solubility characteristics of water (solvating power), density, electronegativity, dipole moment, heat capacity, hydrogen bonding, miscibility, as well as electrophoretic/relaxation effects and ion pairings, among other properties of the brine, as a function of temperature, including deviations from ideal behavior that may be estimated, measured, or observed at elevated downhole pressures.

For example, the pressure effect on solubility of a salt in water may be represented by the following equation:

$$\left(\frac{\delta \ln N_i}{\delta P}\right)_T = -\frac{(V_{i,aq} - V_{i,cr})}{RT}$$

The index i iterates the components, $N_i$ is the mole fraction of the $i^{th}$ component in the solution, P is the pressure, the index T refers to constant temperature, $V_{i,aq}$ is the partial molar volume of the $i^{th}$ component in the solution, $V_{i,cr}$ is the partial molar volume of the $i^{th}$ component in the dissolving solid, and R is the universal gas constant.

It has also been surprisingly found that vapors, e.g. in downhole environments, including hydrocarbon gases, particularly the dense vapor phase, especially at high temperature and high pressure, may solvate ions and exhibit previously unexpected conductivity (low resistivity). In previous models, the resistivity of the dense vapor phase was assumed to be essentially infinite (i.e. no conductivity or about 500 Ω-m to 2000 Ω-m or greater). However, at relatively high temperatures and/or pressures, the dense vapor phase contribute to the conductivity of the formation fluid (e.g. exhibit resistivity of between 0.2 Ω-m to 100 Ω-m, less than 200 Ω-m, less than 300 Ω-m, or less than 500 Ω-m, which closely matches various water or water based solutions), and thus needs to be accounted for to properly characterize a reservoir and the fluids contained therein. This can be relevant when logging to determine presence of water, hydrocarbons and gas.

In logging a well, a logging tool measures the resistivity of the formation and any gases or fluids located therein. Based on the resistivity the components of the formation are determined, i.e., presence of hydrocarbons, water, gas, etc. As noted above, if dense vapors are producing resistivities that are more representative of water solutions, the results of the resistivity log will be inaccurate. It could be the case where a gaseous formation could be interpreted as being more brine filled.

Thermodynamic models and processes have now been developed that account for the high temperature effects on properties of the dense vapor phase, including the non-ideal behavior discovered at extreme downhole conditions. Functions, algorithms, or derivations used to account for the high temperature effects on the dense vapor phase that may be included in embodiments of the thermodynamic model may account for changes in one or more of molecular interactions, solubility constants or solubility characteristics of water (solvating power), density, electronegativity, dipole moment, heat capacity, hydrogen bonding, miscibility, as well as electrophoretic/relaxation effects and ion pairings, among others, as a function of temperature, including deviations from ideal behavior that may be estimated, measured, or observed at elevated downhole temperatures.

Embodiments of the thermodynamic model may also account for the effect of pressure on the dense vapor phase, and thus on the geological formation and the character of the reservoir fluid. Heretofore the effect of pressure on conductivity/resistivity or various other properties of a downhole fluid has not been accounted for in efforts to determine the character of a reservoir. Thermodynamic models according to embodiments disclosed herein may include functions or derivations to account for the effect of pressure on the dense vapor phase. Such functions or derivations, in some embodiments, may also account for deviations from ideal behavior at elevated pressures (the high pressure effect). Functions, algorithms, or derivations used to account for the pressure effects and high pressure effects on the dense vapor phase that may be included in embodiments of the thermodynamic model may account for changes in one or more of molecular interactions, solubility constants or solubility characteristics of water (solvating power), density, electronegativity, dipole moment, heat capacity, hydrogen bonding, miscibility, as well as electrophoretic/relaxation effects and ion pairings, among other properties of the dense vapor phase, as a function of temperature, including deviations from ideal behavior that may be estimated, measured, or observed at elevated downhole pressures.

With respect to ion pairing and other effects that may be accounted for in the model, embodiments of the model used to determine or estimate the character of a reservoir may also include functionalities relative to numerous dissolved salts or ions. Heretofore, conductivity/resistivity algorithms were based on sodium chloride dissolved in the aqueous phase. However, brines and dense gases found in reservoirs around the world may contain other ions or mixtures of ions, such as sodium-, magnesium-, calcium-, potassium-, and strontium-chlorides, bromides, borates, bicarbonates, and sulfates, among other salts that may be present in underground reservoirs as may be known to those of ordinary skill in the art. Embodiments of the model used to characterize a reservoir may thus account for differences in conductivity/resistivity that may occur based on the ions present in the brine, based on ions present in the dense gas as well as the high temperature effects, pressure effects, and/or high pressure effects on the ions and the brine and the dense gas.

Archie's equation, shown below, relates resistivity of a geological formation to its porosity and brine saturation and is typically used to estimate hydrocarbon saturation of the geological formation.

$$1/R_t = \Phi^2/a[S_w^2/R_w] \quad \text{(Archie's equation)}$$

where $R_t$ is the total resistivity in the formation, $\Phi$ is the porosity of the formation, $S_w$ is the water saturation of the formation and $R_w$ is the water resistivity. Heretofore, the conductivity of a fluid-saturated rock was presumed to be primarily a function of the brine content of the reservoir fluid. Archie's equation treats formation and hydrocarbon resistivities as infinite; however, at relatively high temperatures and/or pressures, the dense vapor phase may indeed contribute to the conductivity of the formation fluid (be non-infinite), and thus needs to be accounted for to properly characterize a reservoir and the fluids contained therein.

Embodiments of the model used to characterize a reservoir may thus account for the effect of conductivity in the dense vapor phase, based on a modified Archie's equation as shown below in Equations 1 or 2.

$$1/R_t = \Phi^2/a[S_w^2/R_w + S_G^2/R_G] \qquad \text{Equation 1}$$

or $$1/R_t = \Phi^2/a[S_w^2/R_w + (1-S_w)^2/R_G] \qquad \text{Equation 2}$$

where $S_G$ is the dense vapor phase saturation and $R_G$ is the resistivity of the dense vapor phase.

Reservoirs are known to contain shaly-sand including clay minerals and clay components which may retain water as illustrated in FIG. 1. This highly conductive water, commonly referred to as bound water, increases the value of the conductivity measurements, while decreasing the resistivity measurements. Methods to account for the conductivity effect of bound water in shaly sands have been determined to provide a more accurate evaluation of water saturation. The Dual Water Model, as shown below, takes into account an ionic double-layer in the clay components of shaly sand stones.

$$C_T = \Phi^2[S_{WB}C_{WB} + (1-S_{WB})C_W]$$

or $$1/R_T = \Phi^2[S_{WB}/R_{WB} + (1-S_{WB})/R_W]$$

where $C_T$ is total conductivity, $\Phi$ is total porosity, $S_{WB}$ is bound water saturation, $C_{WB}$ is conductivity of bound water, $C_W$ is conductivity of brine, $R_T$ is total resistivity, $R_{WB}$ is resistivity of bound water, and $R_W$ is resistivity of brine.

Inconsistencies have been detected in the dual water model when applied to shaly sands models, which has now been discovered to be a result from the unaccounted presence of conductive water (relative humidity) or ions (dissolved salts) in the dense vapor phase at high pressure and high temperature conditions as described above.

Embodiments of the model used to characterize a reservoir may thus account for the conductivity effect of bound water, along with the effect of high temperature, pressure and high pressure on the brine and the dense vapor phase (non-infinite resistivity), thereby providing a more accurate evaluation of water saturation. A modified dual water equation is derived to account for the resistivity of the bound water, brine, and dense vapor phase, including the effect of HPHT conditions on the brine and the dense vapor phase. A modified dual water equation may be as follows:

$$(1-S_{WB}) = S_W + S_G$$

and $$(1-x)(1-S_{WB}) = S_G$$

where $S_{WB}$ is the bound water saturation, $S_W$ is the brine saturation and $S_G$ is the dense vapor phase saturation.

Embodiments of the model used to characterize a reservoir may thus account for the conductivity effect of bound water associated with shaly sands, while also accounting for the conductivity of both the brine of the dense vapor phase, including the effect of HPHT conditions on the brine and the dense vapor phase in a modified dual water equation. The derivation of the modified dual water equation is as follows:

$$\frac{1}{R_T} = \phi_T^2 \left[ \frac{S_{WB}}{R_{WB}} + \frac{x(1-S_{WB})}{R_W} + \frac{(1-x)(1-S_{WB})}{R_G} \right]$$

-continued i.e. $\frac{1}{R_T \phi_T^2} - \frac{S_{WB}}{R_{WB}} = \left[ \frac{x(1-S_{WB})}{R_W} + \frac{(1-x)(1-S_{WB})}{R_G} \right]$ i.e. $\left[ \frac{1}{R_T \phi_T^2} - \frac{S_{WB}}{R_{WB}} \right] = \left[ \frac{x(1-S_{WB})}{R_W} + \frac{(1-S_{WB})}{R_G} - \frac{x(1-S_{WB})}{R_G} \right]$ i.e. $\left[ \frac{1}{R_T \phi_T^2} - \frac{S_{WB}}{R_{WB}} - \frac{(1-S_{WB})}{R_G} \right] = \left[ \frac{x(1-S_{WB})}{R_W} - \frac{x(1-S_{WB})}{R_G} \right]$ i.e. $\left[ \frac{1}{R_T \phi_T^2} - \frac{S_{WB}}{R_{WB}} - \frac{(1-S_{WB})}{R_G} \right] = x(1-S_{WB}) \left[ \frac{1}{R_W} - \frac{1}{R_G} \right]$ $x = \frac{\left[ \frac{1}{R_T \phi_T^2} - \frac{S_{WB}}{R_{WB}} - \frac{(1-S_{WB})}{R_G} \right]}{(1-S_{WB}) \left[ \frac{1}{R_W} - \frac{1}{R_G} \right]}$ $\therefore S_W = x(1-S_{WB}) = \left[ \frac{\frac{1}{R_T \phi_T^2} - \frac{S_{WB}}{R_{WB}} - \frac{(1-S_{WB})}{R_G}}{\frac{1}{R_W} - \frac{1}{R_G}} \right]$ $\therefore S_G = 1 - S_{WB} - S_W = 1 - S_{WB} - \left[ \frac{\frac{1}{R_T \phi_T^2} - \frac{S_{WB}}{R_{WB}} - \frac{(1-S_{WB})}{R_G}}{\frac{1}{R_W} - \frac{1}{R_G}} \right]$ $\therefore S_{WB} = \left[ \frac{\phi_{Shale}}{\phi_{Log}} \right]$ or $V_{Shale}$ where $R_T$ is total resistivity, $R_{WB}$ is resistivity of bound water, $R_W$ is resistivity of brine, $R_G$ is resistivity of dense vapor phase, $\Phi_{Shale}$ is porosity of the shale, $\Phi_{Log}$ is total porosity.

Petroleum samples are often classified into fluid types that include black oils, volatile oils, retrograde condensates, wet gases, and dry gases. These fluid types may be distinguished based on carbon number, for example, and often require different considerations for their exploitation. Models used in embodiments for reservoir characterization disclosed herein may rely on a database of stored properties or averaged properties for one or more of these compound groups, which may include one or more of weight percentage, molar weight, molar percentage, carbon number range, as well as pressure-volume-temperature data (such as one or more of phase envelopes, boiling ranges, melting ranges, API gravity, formation volume factor, compressibility factor, density, viscosity, solubility, etc.).

In embodiments, at least one property of the brine may be derived from the stored data and one or more empirical relationships may be derived from an analysis of the pressure-volume-temperature data. In embodiments, at least one property of the dense vapor phase may be derived from the stored data and one or more empirical relationships may be derived from an analysis of the pressure-volume-temperature data. In embodiments, at least one property of the bound water may be derived from the stored data and an empirical relationship may be derived from an analysis of the pressure-volume-temperature data. Empirical relations are derived from an analysis of the stored properties for the compounds and/or groups of compounds (e.g., regression analyses or other numerical methods). For derivation of the empirical relation, it is generally preferred to use transforms having smooth and continuous first and second derivatives for algorithmic estimation of properties. Accordingly, the high temperature effect and/or high pressure effect may be accounted for in the model by use of one, two, three, or more transforms encompassing the overall temperature ranges and/or pressure ranges experienced during drilling and production of reservoirs. In some embodiments, for example, the high temperature effect may be accounted for based on an additive function (i.e., property=f(temperature)+f(high temperature effect)). In other embodiments or for other empirical relations, the high temperature effect may be accounted for by delineation of the algorithm over discrete temperature intervals (i.e., if x<T≤y, property=f(T), if y<T≤z, property=f'(T), etc.). In yet other embodiments, various "constants" used for calculating properties of compounds or interactions between compounds or groups of compounds, such as binary interaction parameters, may be input as a function of temperature or may be input as a constant having different values for discrete temperature ranges. Similar considerations may be used for the pressure effect and high pressure effect.

In addition to the empirical relations derivable from the stored data, the property(ies) and empirical relationships can be used to generate an Equation of State (EOS) model for predicting one or more properties of the reservoir, the reservoir fluid, or a phase of the reservoir fluid, where the equation of state model may incorporate, may be tuned, or may be modified to incorporate the bound water, the high temperature, pressure, and/or high pressure effects as recognizable or derived in the empirical relations. As used herein, an Equation of State model capturing the high temperature effect includes one or more equations to calculate chemical and/or physical properties of a system. The equations of the Equation of State model may include the above-derived empirical relationships, may be equations based on the above-derived empirical relationships, and may also include various equations from various Equations of State known to those of skill in the art. Examples of Equations of State which may be used, tuned, and/or modified may include the Heloeson's EOS, the Redlich-Kwong EOS, the Soave-Redlich-Kwong EOS, Peng Robinson EOS, and others known to one of ordinary skill in the art. The properties of the brine, dense vapor phase, and bound water phases that may be predicted using an Equation of State model may include conductivity, resistivity, density, viscosity, compressibility, composition (e.g., dissolved hydrocarbon content, salinity/ion concentration, ion/salt type(s), etc.), phase activity, pH, free energy, heat capacity, entropy, enthalpy, chemical potentials, and diffusion coefficients, among others.

Figure 2:
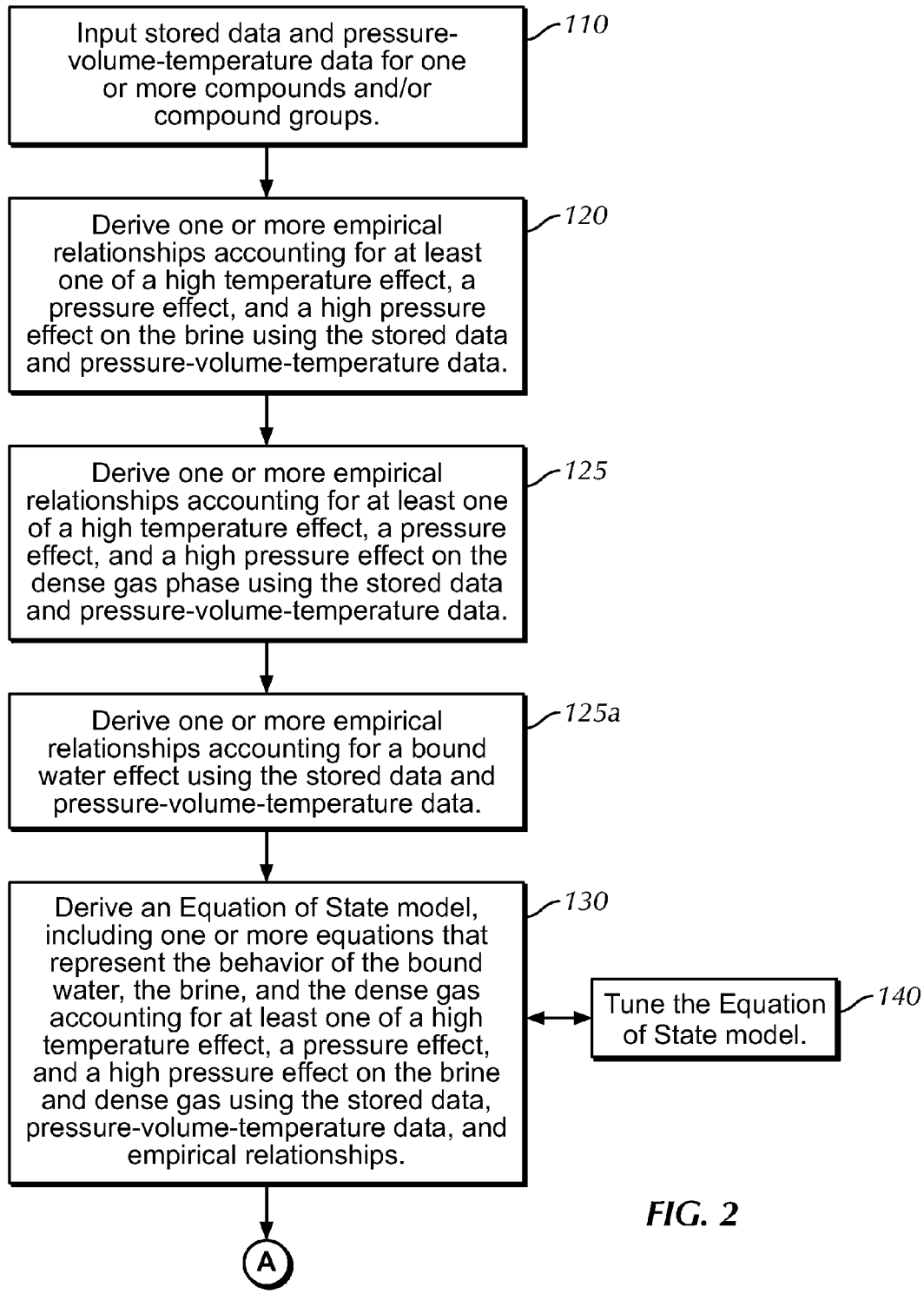
FIG. 2 is a flow chart for a method of developing an Equation of State model that accounts for a high temperature effect, a pressure effect, or a high pressure effect on a reservoir fluid according to embodiments disclosed herein.

Thus, embodiments disclosed herein include a method for generating a model to characterize a wellbore, where the model incorporates at least one of bound water, a temperature effect, a pressure effect, and a high pressure effect. Referring now to FIG. 2, a methodology to characterize a reservoir, reservoir fluid, or phase(s) of a reservoir fluid according to embodiments disclosed herein is illustrated. In step 110, stored data and pressure-volume-temperature data for one or more compounds and/or compound groups may be provided as an input. In step 120, the input stored data and pressure-volume-temperature data may be used to derive one or more empirical relationships accounting for at least one of a high temperature effect, a pressure effect, and a high pressure effect on the brine. In step 125, the input stored data and pressure-volume-temperature data may be used to derive one or more empirical relationships accounting for at least one of a high temperature effect, a pressure effect, and a high pressure effect on the dense vapor phase. In step 125a, for shale and bound water, the input stored data and pressure-volume-temperature data may be used to derive one or more empirical relationships accounting for bound water. For other situations, e.g., outside of shale and bound water, step 125a can be omitted. In step 130, the stored data, pressure-volume-temperature data, and empirical relationships derived therefrom may be used to derive an Equation of State model including one or more equations that represent the behavior of the bound water, brine and dense vapor phase and account for at least one of a high temperature effect, a pressure effect, and a high pressure effect on the brine and the dense vapor phase. The equations of the Equation of State model(s) may be self-derived, may be part of a commercially available software package, or may be a modification of equations provided in commercially available software packages.

Following derivation of the Equation of State, the Equation of State may optionally be tuned in step 140. Tuning of the Equation of State model may be performed by adjusting one or more of the input data, such as critical temperature or critical pressure, binary interaction parameters, volume translation parameters, and constants that may have been generated in deriving the empirical relationships, among others. Adjustment of the one or more variables may be performed for model validation, such as to properly characterize a known reservoir, or may be performed to better simulate or estimate characteristics of an unknown reservoir based on any downhole data that may be obtained during drilling or production of the well. As noted above, tuning may include adjusting various parameters to be a function of temperature or pressure or to have values pertaining to one or more discrete temperature or pressure ranges so as to account for the high temperature effect, pressure effect, and/or high pressure effect. Adjustment of the one or more constants that may have been generated in deriving the empirical relationships, such as the binary interaction parameters, and volume translation parameters, may be done to account for the effect of high temperature, pressure or high pressure on the constants.

Figure 3:
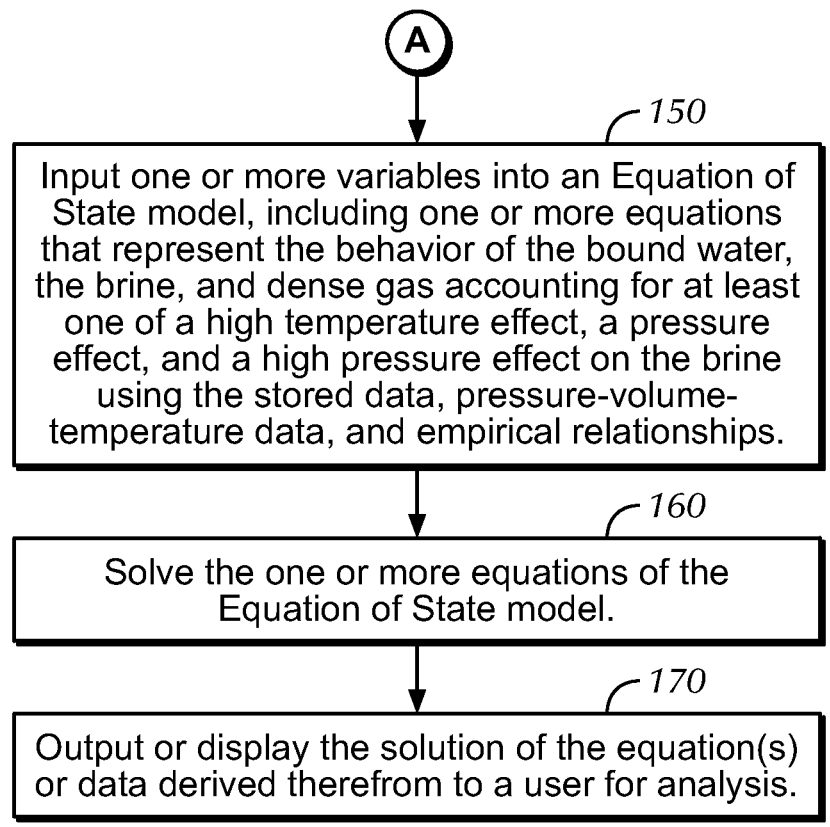
FIG. 3 is a flow chart for a method of characterizing or simulating a reservoir or reservoir fluid, using an Equation of State model that accounts for a high temperature effect, a pressure effect, or a high pressure effect on a reservoir fluid, according to embodiments disclosed herein.

Following derivation of the Equation of State model, as well as any validation or tuning that may be desired, the models may then be used to simulate or characterize a reservoir, reservoir fluid, or phase(s) of a reservoir fluid, as illustrated in FIG. 3. In step 150, one or more values/variables for at least one property of a reservoir, reservoir fluid, or phase(s) of a reservoir fluid may be input into the Equation of State model by a user, such as reservoir temperature, reservoir pressure, conductivity/resistivity, salinity brine properties such as ion/salt type(s), etc. The equations of the Equation of State model may then be solved, such as by a computer-implemented iteration scheme (e.g., Newton-Raphson iteration or other iteration schemes as known to those of skill in the art), in step 160, to determine or estimate one or more additional properties of the reservoir, reservoir fluid, or phase(s) of a reservoir fluid. The one or more properties determined or estimated may include properties such as brine content, hydrocarbon content, bound water content, conductivity/resistivity of the brine, pressure-volume-temperature predictions, aqueous phase activity, density, viscosity, pH, free energy, heat capacity, entropy, enthalpy, phase compositions, chemical potentials, diffusion coefficients, as well as many other variables. In step 170, the solution of the equation (s) or data derived therefrom, such as charts or graphs, may then be output or displayed to a user for analysis. For example, the solution, charts, or graphs may be output to a display device, such as a monitor, or may be printed using a printer associated with the computer used to solve the equations of the Equation of State model.

Figure 4:
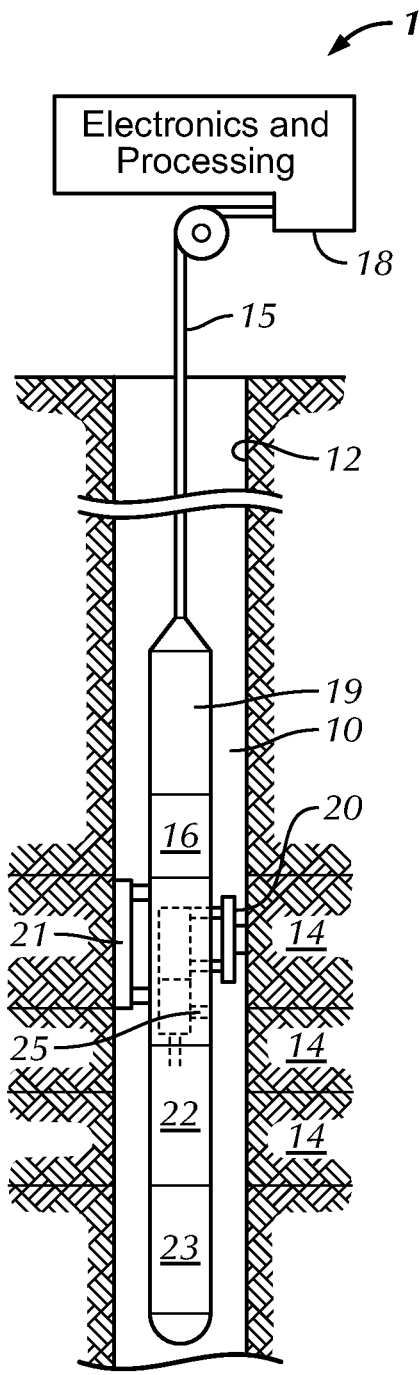
FIG. 4 illustrates a schematic diagram of a petroleum reservoir analysis system useful in characterizing or simulating a reservoir or reservoir fluid according to embodiments disclosed herein.

As noted above, following derivation of the Equation of State model, as well as any validation or tuning that may be desired, the models may then be used to simulate or characterize a reservoir, reservoir fluid, or phase(s) of a reservoir fluid, including characterization of reservoirs encountered during a drilling operation. For example, in some embodiments, a petroleum reservoir analysis system as shown in FIG. 4 may be used to obtain or infer at least one property of the reservoir, such as temperature, pressure, porosity, conductivity/resistivity, or other data that may be obtained or inferred during drilling or using a downhole analysis tool. The system 1 includes a borehole tool 10 suspended in the borehole 12 from the lower end of a typical multiconductor cable 15 that is spooled in a usual fashion on a suitable winch (not shown) on the formation surface. The cable 15 is electrically coupled to an electrical control system 18 on the formation surface. The tool 10 includes an elongated body 19 which encloses the downhole portion of the tool control system 16. The elongated body 19 also carries a selectively extendable fluid admitting assembly 20 and a selectively extendable tool anchoring member 21 which are respectively arranged on opposite sides of the tool body. The fluid admitting assembly 20 is equipped for selectively sealing off or isolating selected portions of the wall of the borehole 12 such that pressure or fluid communication with the adjacent geological formation 14 is established. The geological formation 14 may include various strata which may have various phases associated with them. In an embodiment, the geological formation may include an aqueous phase and a hydrocarbon phase. The aqueous phase is typically the brine within the geological formation. Also included with tool 10 may be means for determining the downhole pressure and temperature (not shown) and a fluid analysis module 25 through which the obtained fluid flows. The fluid may thereafter be expelled through a port (not shown) or it may be sent to one or more fluid collecting chambers 22 and 23 which may receive and retain the fluids obtained from the formation. Control of the fluid admitting assembly 20, the fluid analysis module 25, and the flow path to the collecting chambers is maintained by the control systems 16 and 18. As will be appreciated by those skilled in the art, the surface-located electrical control system 18 includes data processing functionality (e.g., one or more microprocessors, associated memory, and other hardware and/or software) to implement the invention as described herein. The electrical control system 18 can also be realized by a distributed data processing system wherein data measured by the tool 10 is communicated (preferably in real time) over a communication link (typically a satellite link) to a remote location for data analysis as described herein. The data analysis can be carried out on a workstation or other suitable data processing system (such as a computer cluster or computing grid).

An example of a borehole tool suitable for capturing fluid samples for data analysis is the Modular Dynamic Formation Tester (MDT) tool, available from Schlumberger Technology Corporation of Sugar Land, Tex., USA. The MDT tool provides a controlled channel of hydraulic communication between the reservoir fluid and the wellbore and allows withdrawal of small amounts of formation fluid through a probe that contacts the reservoir rock (formation). Such downhole fluid sampling is advantageous because the sampling is more accurate downhole. More specifically, in the event that the sampling pressure is above the saturation pressure, the fluid will be in a single phase ensuring that the original composition is being analyzed. For pressures below the saturation pressure, a measurement of the properties of the liquid phase in the oil zone and the associated gas above it will yield a more accurate sampling than a sample recombined at the surface. Indeed, it may be difficult to retain the sample in the state it exists downhole when it is retrieved to surface. Historically, fluid samples collected by well logging tools were brought to the surface for analysis in the laboratory. However, recent developments in the MDT tool have made possible the direct measurement of fluid properties downhole during the pump-out or sampling sequence, which is referred to herein as "downhole fluid analysis (DFA)." Details of the MDT tool and its capabilities for downhole fluid analysis may be obtained with reference to U.S. Pat. Nos. 3,859,851; 4,994,671; 5,167,149; 5,201,220; 5,266,800; and 5,331,156, all of which are incorporated herein by reference.

Downhole fluid analysis is advantageous because information is provided in real time, in contrast to a laboratory analysis that may require several days, or surface wellsite analysis that may result in undesirable phase transitions as well as the loss of key constituents. A detailed description of the fluid properties is desirable for an accurate modeling of the fluids in the reservoir. Indeed, decisions such as the type of well completion, production procedures, and the design of the surface handling and processing facilities are affected by the characteristics of the produced fluids.

Figure 5:
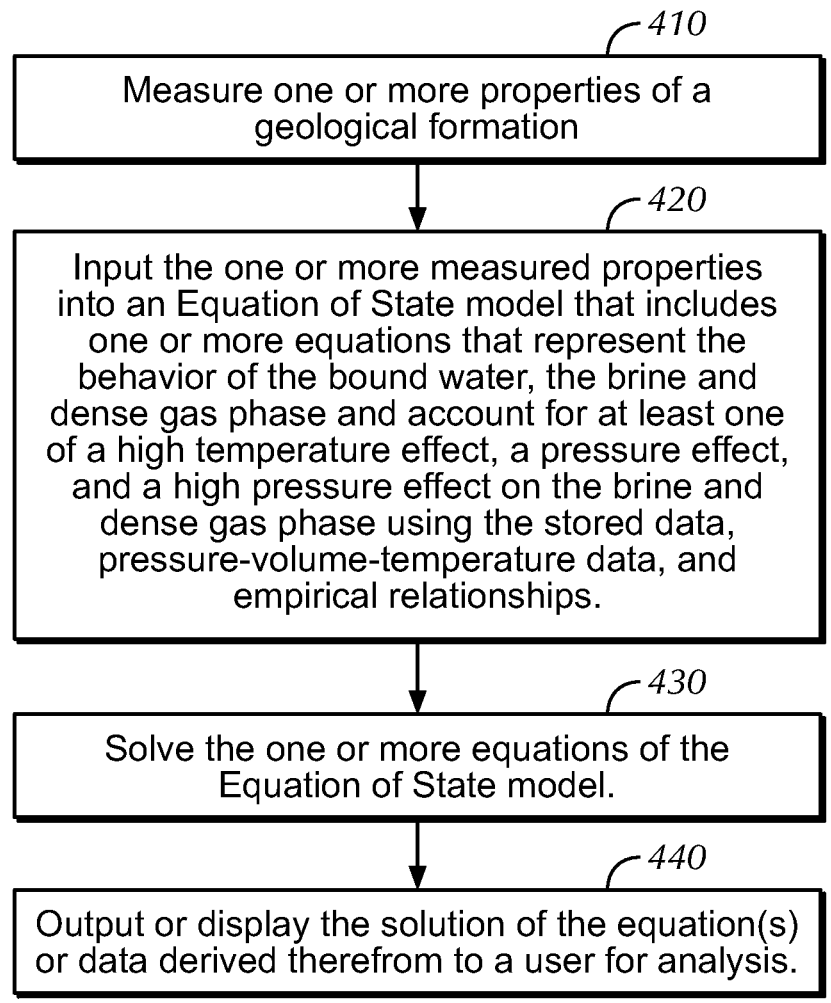
FIG. 5 is a flow chart for a method of characterizing or simulating a reservoir or reservoir fluid based on measurements made using the system of FIG. 3 (or other measurement devices or methods), using an Equation of State model that accounts for a high temperature effect, a pressure effect, or a high pressure effect on a reservoir fluid, according to embodiments disclosed herein.

The apparatus of FIG. 4 may be employed with the methodology of FIG. 5 to characterize, estimate, simulate, and/or analyze one or more properties of the geological formations encountered during drilling as a function of pressure and temperature, including one or more of a high temperature effect, a pressure effect, and a high pressure effect. For example, the measurements taken using the system of FIG. 3 may be used to characterize the compositional components, the fluid properties, or other aspects of a reservoir of interest.

The downhole tool measures at least one first property of the geological formation in step 410. The at least one first property may include, but is not limited to, the salinity of the reservoir fluid or a phase of the reservoir fluid, formation temperature and pressure, the types of ions present in the formation fluid or a phase of the formation fluid, the number of co-existing phases present (bound water, water/brine, hydrocarbon gases, hydrocarbon liquids), oil/water/gas ratios, and resistivity of the brine, among other measurable or quantifiable variables.

In step 420, the one or more measured properties may then be input into an Equation of State model that includes one or more equations that represent the behavior of the bound water, brine and dense vapor phase and account for at least one of a high temperature effect, a pressure effect and a high pressure effect on the brine and dense vapor phase. In step 430, the equations of the Equation of State may be solved, as described above, to determine at least one second property of the reservoir, reservoir fluid, or phase(s) of the reservoir fluid. The at least one second property may be, but is not limited to, bound water content, brine content, hydrocarbon content, resistivity of the brine, resistivity of the dense vapor phase, resistivity of the bound water, phase activity, phase fugacity, density, viscosity, pH, free energy, heat capacity, entropy, enthalpy, phase compositions, chemical potentials, and diffusion coefficients. The at least one second property may also include, but is not limited to, salinity, formation temperature and pressure, types of ions present, and the number of coexisting phases present.

In step 440, the solution of the equation (s) or data derived therefrom, such as charts or graphs, may then be output or displayed to a user for analysis. For example, the solution, charts, or graphs may be output to a display device, such as a monitor, or may be printed using a printer associated with the computer used to solve the equations of the Equation of State model.

In other embodiments, data input (stored data or PVT data) in embodiments disclosed herein may be generated using a high pressure high temperature testing apparatus. For example, a test apparatus including a view cell may be used to investigate, measure, or observe phase behavior of salts or other ions in brines and dense gases (including methane, $CO_2$, $H_2S$, etc. as described above) at extreme temperatures and/or pressures, as well as the phase behavior of mixtures of brine, dense gases, and/or heavier hydrocarbons (VLLE, SVLLE, etc.). Such laboratory testing apparatus may be used to measure the effects of high temperature and pressure on the brine and dense vapor phases, providing data input to the model for deriving the high temperature, pressure, and/or high pressure effects, or may be used to estimate various parameters (binary interaction parameters, etc.) or to determine how such parameters may be modified to account for the high temperature, pressure, and/or high pressure effects.

In the manner described above, the character of a reservoir or reservoir fluid may be determined, estimated, or simulated, accounting for one or more of bound water, a high temperature effect on the brine, a pressure effect on the brine, a high pressure effect on the brine, a high temperature effect on the dense vapor phase, a pressure effect on the dense vapor phase, and a high pressure effect on the dense vapor phase. Determination of the character of the wellbore may provide valuable data with respect to estimating hydrocarbon reserves (gas and/or oil), viability for producing a reservoir (i.e., fluid-containing strata) encountered during drilling, as well as to simulate production conditions that may allow an optimal recovery of hydrocarbons from the reservoir.

EXAMPLES

Figure 6:
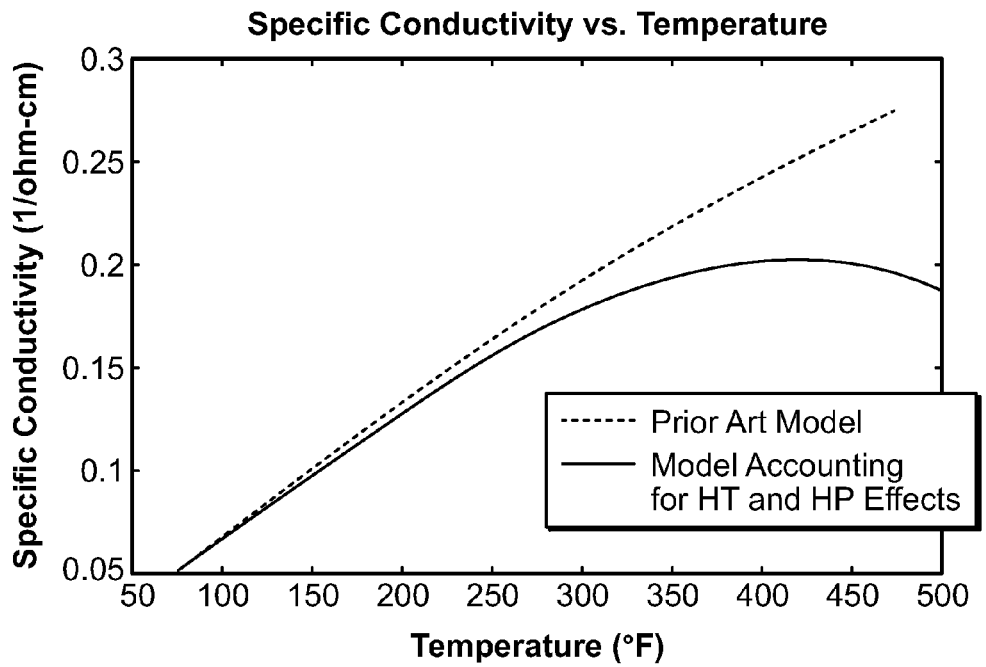
FIGS. 6 and 7 graphically compare conductivity of a brine solution representing connate water as a function of temperature for an Equation of State model according to embodiments disclosed herein accounting for a high temperature effect, a pressure effect, or a high pressure effect on a reservoir connate water, with a prior art model that does not account for any of a high temperature effect, a pressure effect, or a high pressure effect on a reservoir fluid.
Figure 7:
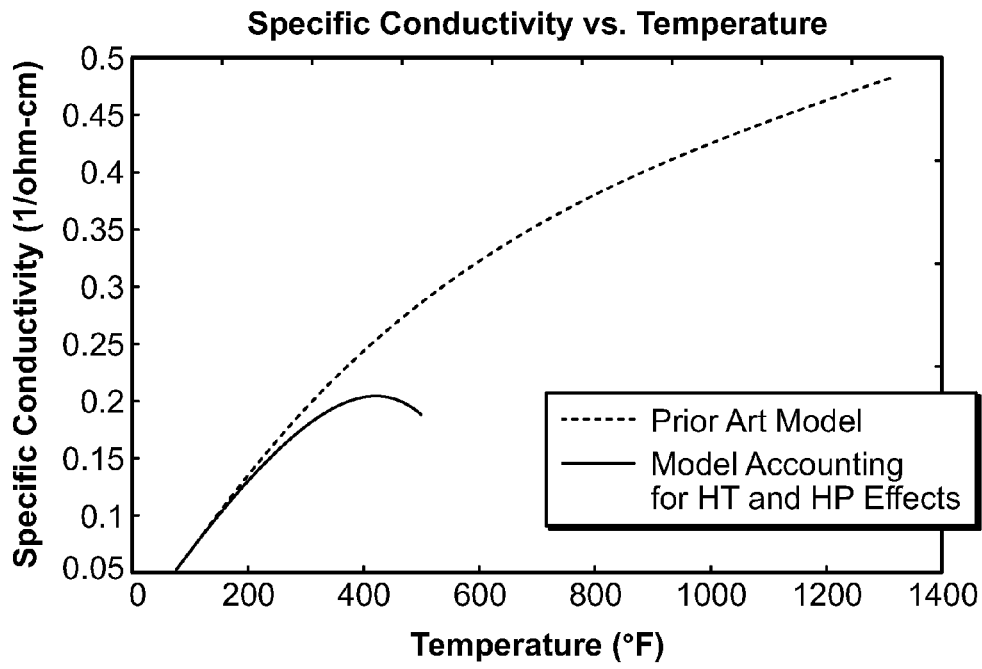

FIGS. 6 and 7 graphically compare conductivity as a function of temperature for an Equation of State model according to embodiments disclosed herein accounting for a high temperature effect, a pressure effect, and a high pressure effect on a reservoir fluid, with a prior art model that does not account for any of a high temperature effect, a pressure effect, or a high pressure effect on a reservoir fluid. The prior art model does not correctly predict the resistivity/conductivity of the brine solutions at higher temperatures and pressures. Accounting for electrophoretic/relaxation effects and ion pairing at high temperatures, as well as accounting for different solvated ions in connate water and dissolved gasses, differences on the order of 5% to 30% in conductivity are observed. Such large differences could lead to incorrect interpretation of the well data, and may potentially affect measurements in thin beds and formations with higher water cut (rocks with low hydrocarbon saturation). In other words, by accounting for a high temperature effect, pressure effect, and/or high pressure effect, it may be possible to more accurately predict hydrocarbon content of the formations encountered during drilling, as well as to more efficiently produce said formations.

Figure 8:
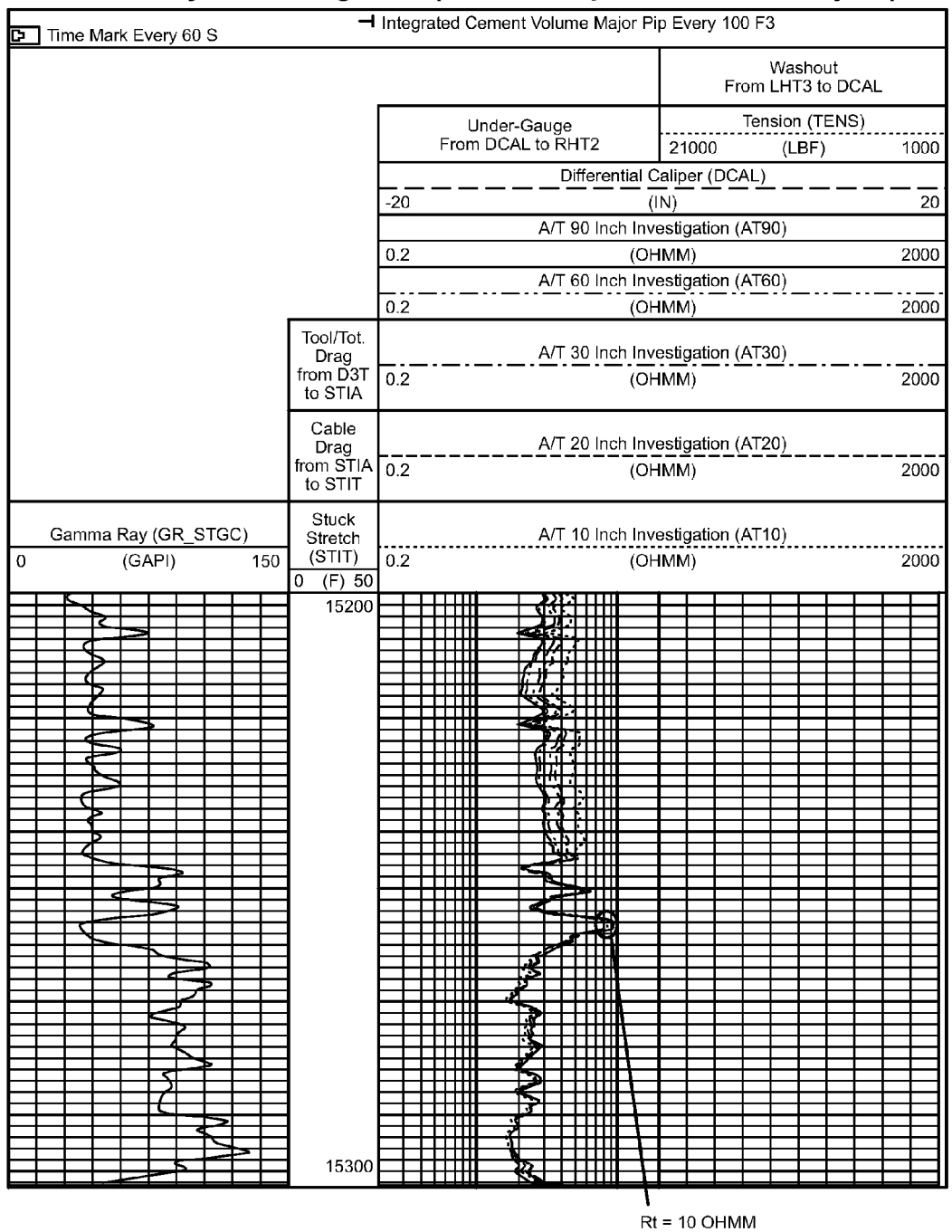
FIG. 8 graphically illustrates resistivity well log data at high pressure and high temperature conditions.
Figure 9:
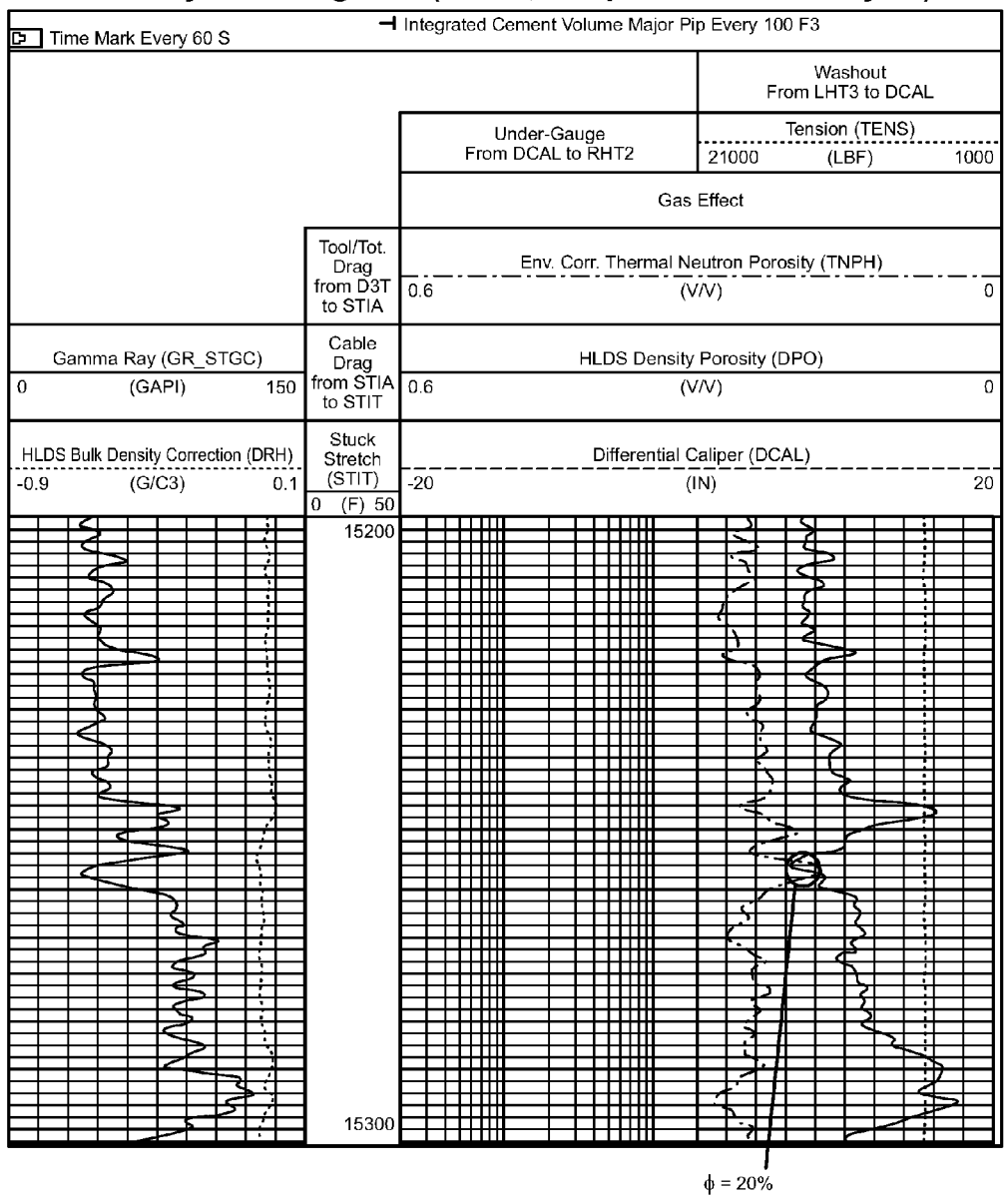
FIG. 9 graphically illustrates porosity well log at high pressure and high temperature conditions.

Next, the high temperature effect and the high pressure effect on reservoir fluids were accounted for in determining the hydrocarbon saturation of a reservoir using log data acquired from a gas well analysis at 400° F. and 14 k psi. From FIG. 8, the log data shows a total resistivity of 10 Ohm-m and from FIG. 9, a total porosity of 20%. Calculations were performed to compare the hydrocarbon saturation estimated using an Equation of State model according to embodiments disclosed herein accounting for a high temperature effect, a pressure effect, and a high pressure effect on the brine, with a prior art model that does not account for any of a high temperature effect, a pressure effect, or a high pressure effect on the brine.

From the log data, the conductivity of the brine was estimated as 0.2 $(Ohm-cm)^{-1}$ from the EOS model accounting for HP and HT conditions as compared to 0.24 $(Ohm-cm)^{-1}$ from the prior art model. The EOS model accounting for HP and HT, accounting for HP and HT effects on the brine only, predicted the hydrocarbon saturation as 68.4% as compared to the prior art model estimate of 64.7%. A summary of the results in presented in Table 1.

TABLE 1

| Properties | Prior art model for brine | Model accounting for HP and HT effect on brine |
|---|---|---|
| $\sigma$ ($\Omega$-cm)$^{-1}$ | 0.24 | 0.2 |
| $R_w$, $\Omega$-m | 0.04 | 0.05 |
| $S_w$, % | 31.6 | 35.3 |
| $S_{HC}$, % | 68.4 | 64.7 |

As shown above, the prior art model estimated a greater hydrocarbon saturation as compared to the model which accounts for the HP and HT effects on the brine.

Calculations were also performed to estimate the hydrocarbon saturation using an Equation of State model according to embodiments disclosed herein accounting for a high temperature effect, a pressure effect, and a high pressure effect on the brine and dense gas. Without knowing the production history of the well, two cases were considered. Case 1 assumed the well only produces methane. Case 2 assumed the well produced a dense vapor phase mixture of methane, and carbon dioxide (20%), water, sodium chloride, potassium chloride and barium sulfate. Using the total resistivity, total porosity and water resistivity from above, the EOS model accounting for HP and HT in the brine and dense vapor phase estimated the resistivity of the dense vapor phase for case 1 as 2 $\Omega$-m and for case 2 as 2.5 $\Omega$-m. The EOS model accounting for HP and HT also estimated the hydrocarbon saturation of case 1 as 71.9% and for case 2 as 77.7%. A summary of the results in presented in Table 2.

TABLE 2

| Properties | Model accounting for HP and HT non-infinite resistivity effect on dense vapor phase (case 1) | Model accounting for HP and HT non-infinite resistivity effect on dense vapor phase (case 2) |
|---|---|---|
| $R_g$, $\Omega$-m | 2 | 2.5 |
| $S_w$, % | 28.1 | 22.2 |
| $S_{HC}$, % | 71.9 | 77.7 |

As shown above, both cases which account for the HPHT effects on the brine and the dense vapor phase provide a hydrocarbon saturation greater than either the prior art model or the model which only accounts for the HPHT effects on the brine. Because the dense vapor phase is conductive (non-infinite resistivity), the actual hydrocarbon content of the formation is greater than would be predicted using prior art methods. The HPHT effects of the dense vapor phase and the aqueous phase can provide accurate resistivity measurements for estimating reserves at HPHT conditions. Tools and software may also be calibrated for particular environments of the geological formation.

Figure 10:
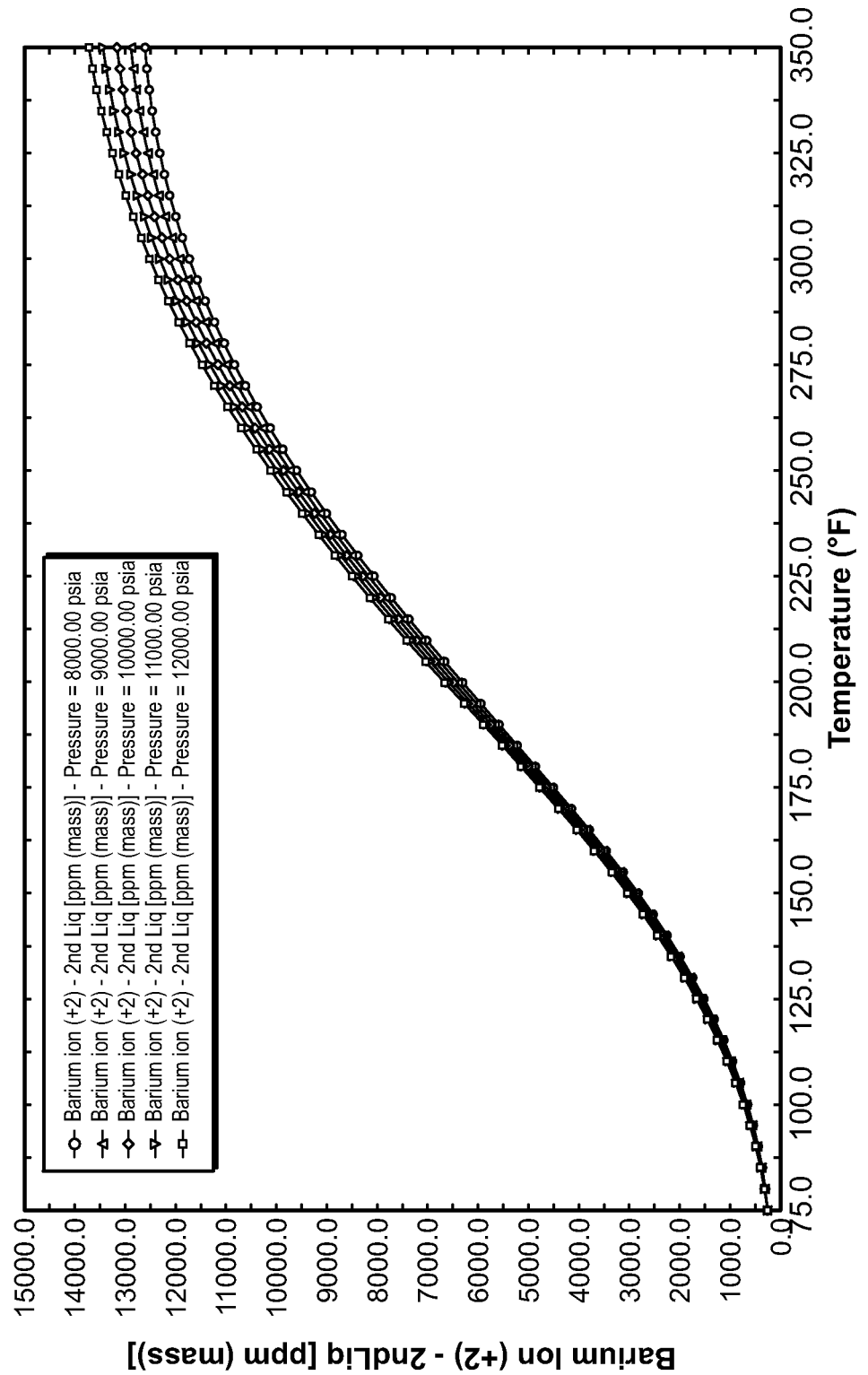
FIG. 10 is a graphical representation of how the $Ba^{2+}$ concentration in a dense vapor phase may change as a function of temperature and pressure.

Referring now to FIG. 10, FIG. 10 is a graphical representation of how the $Ba^{2+}$ concentration in a dense vapor phase may change as a function of temperature and pressure. While encompassing only a limited range of temperatures and pressures, it can be readily appreciated that the dense vapor phase may contain a significant amount of ions that may affect production of a reservoir.

As described above, embodiments disclosed herein account for one or more of a high temperature effect, a pressure effect, and a high pressure effect on the simulated or estimated properties of brines and dense gases encountered in reservoirs. By accounting for such effects, embodiments disclosed herein may allow more accurate characterization of reservoirs, reservoir fluids, or phase(s) or reservoir fluids, more accurately predict hydrocarbon content of the formations encountered during drilling, and allow for extension of such simulations to provide for an increase in efficiency for production of reservoirs of interest.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing one or more properties of a geological formation including brine and a dense vapor phase, the method comprising:
    (a) measuring at least one first property of the geological formation using a downhole tool;
    (b) in an electrical control system, inputting the at least one first property into a model, the model accounting for a high pressure effect on the dense vapor phase by accounting for a resistivity of the dense vapor phase in the formation, wherein the dense vapor has a non-infinite resistivity, and wherein the model comprises a modified dual water model to account for the dense vapor having the non-infinite resistivity and the resistivity of abound water;
    (c) in the electrical control system, solving the model to produce data relating to at least one second property of the geological formation; and
    (d) outputting the at least one second property to a visual medium for inspection.

2. The method of claim 1, wherein the model accounts for a high temperature effect and/or a high pressure effect on the dense vapor phase where the dense vapor has a non-infinite resistivity.

3. The method of claim 1, wherein the at least one first property comprises at least one of reservoir temperature, reservoir pressure, conductivity/resistivity, salinity, number of co-existing phases present, oil/water/gas ratios, and ion/salt type.

4. The method of claim 1, wherein the at least one second property comprises at least one of bound water content, brine content, hydrocarbon content, conductivity/resistivity of the brine, pressure-volume-temperature predictions, phase fugacity, aqueous phase activity, density, viscosity, pH, free energy, heat capacity, entropy, enthalpy, phase compositions, chemical potentials, diffusion coefficients, salinity, formation temperature and pressure, types of ions present, and the number of coexisting phases present.

* * * * *